United States Patent [19]

Ikegami et al.

[11] Patent Number: 4,564,308

[45] Date of Patent: Jan. 14, 1986

[54] SPRING ROD FOR STRAP

[75] Inventors: Iwao Ikegami, Nirayama, Japan; Tooru Mashida, No. 26-16, Miyamae 5 chome, Suginami-ku, Tokyo, Japan, 168

[73] Assignee: Tooru Mashida, Japan

[21] Appl. No.: 469,707

[22] Filed: Feb. 25, 1983

[30] Foreign Application Priority Data

Mar. 8, 1982 [JP] Japan .............................. 57-31363[U]
Aug. 2, 1982 [JP] Japan ............................ 57-117581[U]

[51] Int. Cl.[4] ................................................ F16B 7/10

[52] U.S. Cl. .................................... 403/166; 224/164; 24/265 B; 24/265 WS

[58] Field of Search ............... 224/164, 168, 175, 177, 224/180; 24/265 B, 265 WS; 403/166

[56] References Cited

U.S. PATENT DOCUMENTS

| | | | |
|---|---|---|---|
| 551,040 | 12/1895 | Morgan | 24/265 B |
| 1,742,457 | 1/1930 | Wittman | 24/265 WS |
| 2,477,877 | 5/1947 | Jeffrey . | |
| 3,824,783 | 7/1974 | Nadeau | 24/265 B X |
| 4,285,450 | 8/1981 | Barnes . | |

FOREIGN PATENT DOCUMENTS

| | | | |
|---|---|---|---|
| 113397 | 5/1926 | Switzerland | 24/265 B |
| 255520 | 1/1949 | Switzerland | 24/265 WS |
| 327838 | 2/1958 | Switzerland . | |

*Primary Examiner*—Andrew V. Kundrat
*Attorney, Agent, or Firm*—Lowe, King, Price & Becker

[57] ABSTRACT

The invention provides a spring rod for a strap. A stationary member with a projection is inserted and fixed at one end of a cylinder with a longitudinal slit. A slider is slidably inserted in the cylinder with a spring interposed between the slider and the stationary member. The slider has a projection which has a tongue protruding through the slit of the cylinder.

5 Claims, 13 Drawing Figures

SPRING ROD FOR STRAP

BACKGROUND OF THE INVENTION

The present invention relates to a spring rod for a strap such as a watch strap.

A conventional spring rod for a watch strap has a structure as shown in FIG. 1. A cylinder 1 is tapered at its two ends 1*a* and 1*b*, and houses sliders 2*a* and 2*b* therein. Projections 3*a* and 3*b* each having two annular ribs formed thereon are formed on the distal ends of the sliders 2*a* and 2*b*, respectively. A spring 4 serves to constantly urge the sliders 2*a* and 2*b* outward.

In order to mount a spring rod of the structure as described above, the projection 3*a* is inserted in a hole 6*a* of a mounting arm 5*a* of the watch. Then, by pushing the portion of the projection 3*b* between the annular ribs toward the cylinder using a small member such as a branch member or needle, so that the projection 3*b* is inserted into the cylinder 1, the spring rod can be fitted between mounting arms 5*a* and 5*b*. When the projection 3*b* opposes a hole 6*b* of the mounting arm 5*b*, the small member is released from the projection 3*b*. Then, the projection 3*b* is inserted into the hole 6*b* by the biasing force of the spring 4.

However, in a spring rod of this structure, engagement between the small member and the projection is difficult to attain. Therefore, mounting of such a spring rod between mounting arms is difficult.

SUMMARY OF THE INVENTION

It is a first object of the present invention to provide a spring rod for a strap, which eliminates the drawbacks of conventional spring rods for straps; and which comprises a cylinder having a first projection at one end thereof and a longitudinal slit extending from the other end thereof, a slider which is slidably mounted at the other end of the cylinder and which has a second projection on an outer end thereof, and a biasing spring interposed between the first projection and the slider, wherein the slider is slidable by employing the slit and may be observed through the slit, operation of the slider is easy and reliable, and confirmation of insertion of the first projection into a mounting arm is easy.

It is a second object of the present invention to provide a spring rod for a strap, wherein the slit is formed along a part of the cylinder.

It is a third object of the present invention to provide a spring rod for a strap, wherein the slit is formed along the entire length of the cylinder.

It is a fourth object of the present invention to provide a spring rod for a strap, wherein the slider has a tongue for finger engagement and the tongue protrudes through the slit.

It is a fifth object of the present invention to provide a spring rod for a strap, wherein the slider has an engaging portion inside the cylinder.

It is a sixth object of the present invention to provide a spring rod for a strap, wherein the first projection is mounted on a stationary member which is securely fixed to one end of the cylinder.

It is a seventh object of the present invention to provide a spring rod for a strap, wherein the cylinder has at its other end a stop for stopping the movement of the slider, so that undue removal of the slider from the cylinder when the spring rod is demounted from the mounting arms of a watch may be prevented by the Stop.

It is an eighth object of the present invention to provide a spring rod for a strap, wherein the stop comprises a pipe which is forcibly inserted into the cylinder.

It is a ninth object of the present invention to provide a spring rod for a strap, wherein the pipe has a slit along its entire length.

It is a tenth object of the present invention to provide a spring rod for a strap, wherein the stop comprises a zigzag slit formed at the other end of the cylinder.

It is an eleventh object of the present invention to provide a spring rod for a strap, wherein the stop comprises a slit which is formed in a right angle at the other end of the cylinder.

It is a twelfth object of the present invention to provide a spring rod for a strap, wherein the first projection is slidable relative to the cylinder.

It is a thirteenth object of the present invention to provide a spring rod for a strap, wherein the first projection is formed on a pin which is inserted inside a stop which is, in turn, arranged inside the cylinder.

DETAILED DESCRIPTION OF THE PREFERRED EMBODIMENTS

Figure 1:
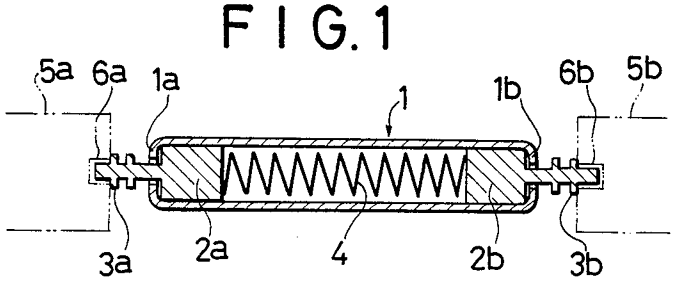
FIG. 1 is a sectional view of a conventional spring rod.
Figure 2:
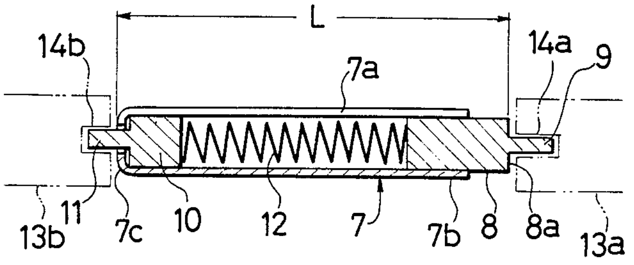
FIG. 2 is a sectional view of an embodiment of the present invention.
Figure 3:
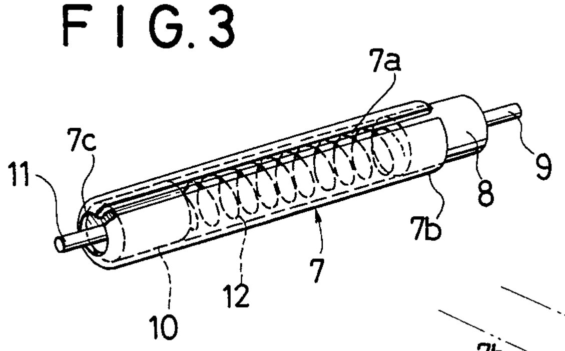
FIG. 3 is a perspective view of the spring rod shown in FIG. 2.

Referring to FIGS. 2 and 3, a longitudinal slit 7*a* is formed along the entire length of a cylinder 7; the cylinder 7 thus has a C-shaped sectional shape. One end 7*b* of the cylinder 7 is not tapered, while the other end 7*c* thereof is tapered. A stationary member 8 is inserted into the one end 7*b* of the cylinder 7. The outer diameter of the stationary member 8 is slightly greater than the inner diameter of the cylinder 7. The stationary member 8 has a first projection 9 at its one end. Thus, the cylinder 7 has the first projection 9 extending from the one end 7*b* thereof. A slider 10 is housed in the cylinder 7, and has an outer diameter which is slightly smaller than the inner diameter of the cylinder 7. The slider 10 has a second projection 11 at its outer end. A spring 12 constantly urges the stationary member 8 and the slider 10 apart, i.e., outward.

A method for mounting a spring rod having the structure described above between mounting arms of a watch will now be described. The cylinder 7 having the slit 7a extending along the longitudinal direction thereof also has a degree of elasticity in the radial direction to allow the stationary member 8 to extend from it by a predetermined length. Therefore, length L between the the other end 7c of the cylinder 7 and an outer end 8a of the stationary member 8 may be adjusted to equal the distance between mounting arms 13a and 13b of the watch. Subsequently, the first projection 9 of the stationary member 8 is inserted into a hole 14a of the mounting arm 13a. Using a small member such as a needle, the second projection 11 of the slider 10 is pushed into the cylinder 7, so that the spring rod can be fitted between the mounting arms. When the second projection 11 opposes a hole 14b of the mounting arm 13b, the force of the small member is released. Then, the second projection 11 is inserted into the hole 14b by the biasing force of the spring 12.

Figure 4:
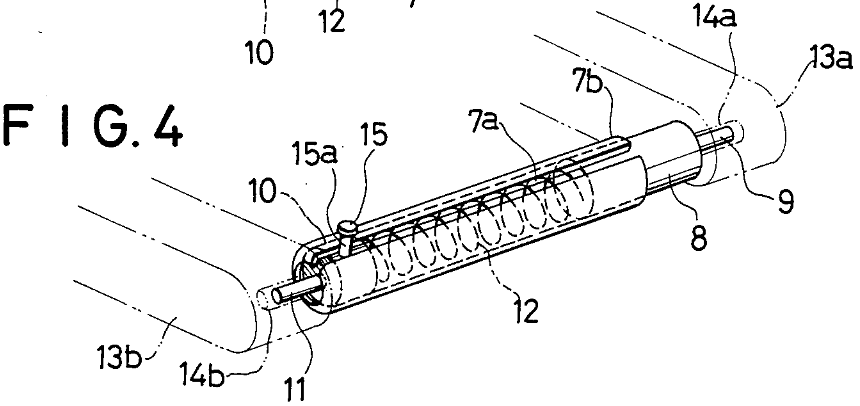
FIG. 4 is a perspective view of another embodiment of the present invention.

In accordance with another embodiment shown in FIG. 4, a slider 10 has a tongue 15 which protrudes through a slit 7a. The tongue 15 further protrudes through a hole 17 formed in a looped portion of a watch strap 16 which forms a loop corresponding to the mounting arms.

In order to assemble a spring rod as shown in FIG. 4, the tongue 15 of the slider 10 is inserted through the hole 17 formed in the looped portion of the watch strap 16 so that the tongue 15 is exposed to the outside.

Figure 5:
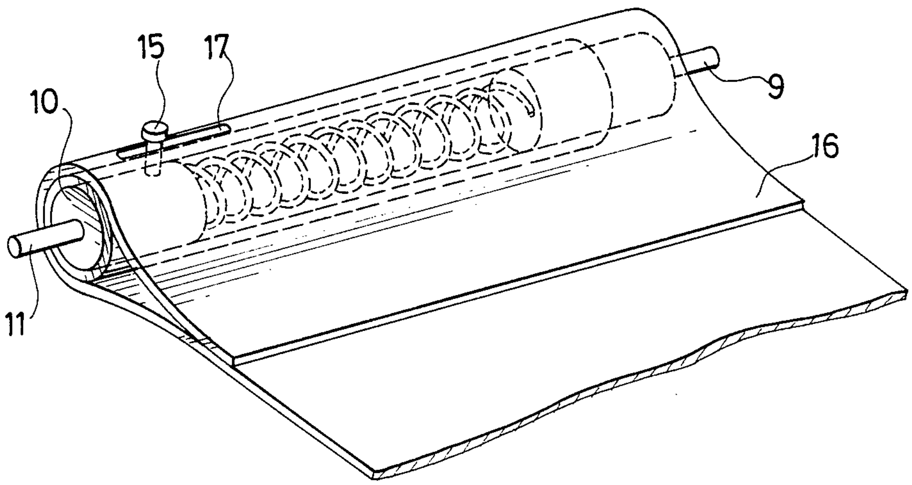
FIG. 5 is a perspective rear view of the spring rod shown in FIG. 4 as it is inserted into a loop of a watch strap.

Subsequently, the cylinder 7 is inserted into the loop formed by the looped portion of the watch strap 16 with the nontapered end 7b leading such that a shaft 15a of the tongue 15 is aligned with the slit 7a of the cylinder 7, as shown in FIG. 5. The spring 12 and the stationary member 8 are inserted in that order into the nontapered end 7b of the cylinder 7, such that the length L as defined above corresponds to the distance between the mounting arms 13a and 13b.

In order to mount this spring rod between the mounting arms 13a and 13b, the first projection 9 is first inserted into the hole 14a of the mounting arm 13a. Then, by applying pressure to the tongue 15, the slider 10 is moved inwardly along the cylinder 7, so that the spring rod can be fitted between the mounting arms 13a and 13b. When the second projection 11 opposes the hole 14b of the mounting arm 13b, the tongue 15 is released. Then, the second projection 11 is inserted into the hole 14b by the biasing force of the spring 12.

Figure 6:
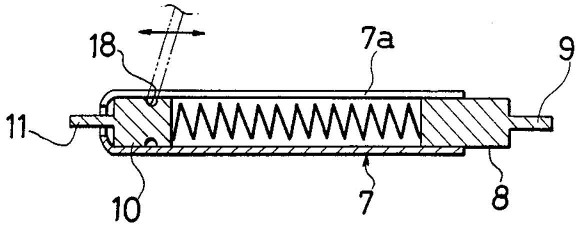
FIG. 6 is a sectional view of still another embodiment of the present invention.

In accordance with still another embodiment shown in FIG. 6, a slider 10 which is located inside a cylinder 7 has an engaging portion comprising an annular groove 18. The spring rod of this embodiment may also be used for a watch strap having a hole in a looped portion thereof as in the former embodiment. In order to mount the spring rod of this embodiment between mounting arms of a watch, a needle or the like is inserted into the annular groove 18 through the hole formed in the looped portion of the watch strap and through a slit 7a so as to move a second projection 11 of the slider 10 inwardly along the cylinder 7.

Figure 7:
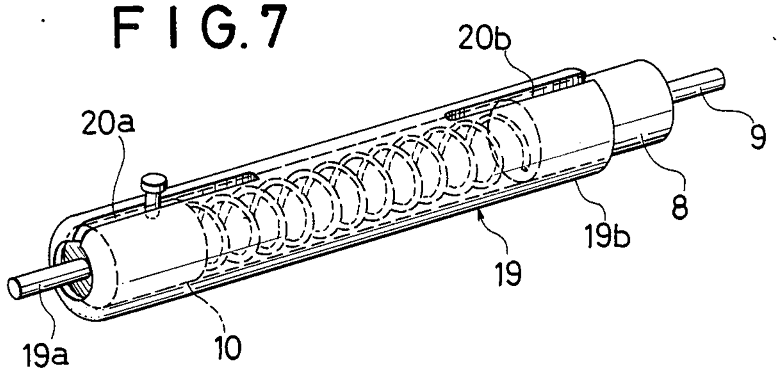
FIG. 7 is a perspective view of still another embodiment of the present invention.

In accordance with still another embodiment shown in FIG. 7, a cylinder 19 has slits 20a and 20b which extend from its two end respectively toward the center thereof. One end 19b of the cylinder 19 is not tapered, while the other end 19a thereof is tapered. As in the case of the first embodiment described above, a slider 10 is inserted into the other end 19a while a stationary member 8 is inserted into the one end 19b. The spring rod of this embodiment may be mounted mounting arms of a watch in the same manner as mentioned above.

Figure 8:
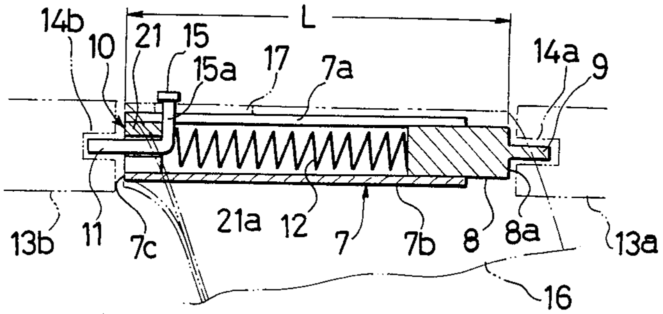
FIG. 8 is a sectional view of still another embodiment of the present invention.
Figure 9:
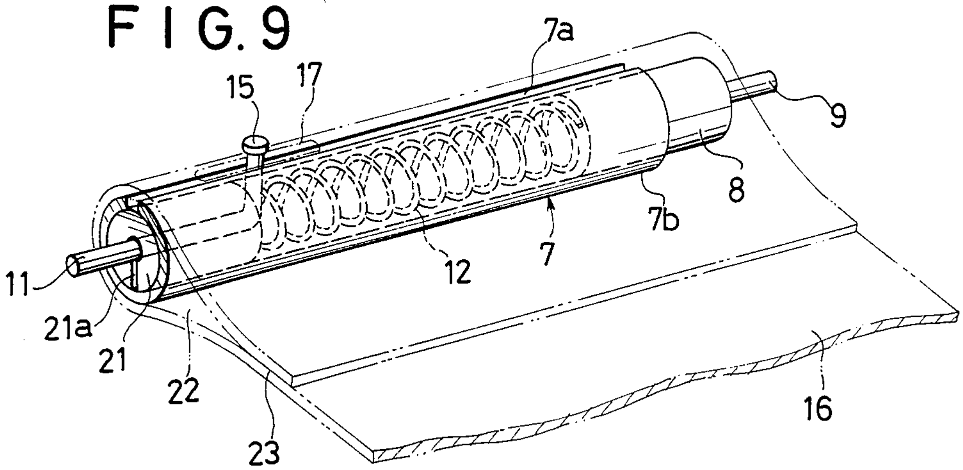
FIG. 9 is a perspective view of the spring rod shown in FIG. 8.

In accordance with still another embodiment shown in FIGS. 8 and 9, a slider 10 has an L-shaped sectional shape, incorporating a shaft 15a at its inner end. The shaft 15a has a tongue 15 at its distal end and extends to the outside of a cylinder 7 through a slit 7a formed therein. The slider 10 has a second projection 11 at its outer end. The second projection 11 extends to the outside of the cylinder through a stop 21 comprising a pipe having a longitudinal slit 21a therein. The outer diameter of the stop 21 is greater than the inner diameter of the cylinder 7 such that the stop 21 is fixed by friction upon being inserted into the cylinder 7. The slit 21a may have a zigzag form or may be omitted. A pipe with a slit allows more stable insertion inside the cylinder 7 than a pipe without a slit.

In order to assemble a spring rod of this embodiment, the stop 21 is first pressed into the cylinder 7 to be fixed at the tapered end 7c thereof. Then, the slider 7 is inserted through the hole 17 in a looped portion 22 of the watch strap 16 such that the tongue 15 is exposed to the outside.

Subsequently, the cylinder 7 is inserted into the loop formed by the looped portion 22 with the end opposite to the end at which the stop 21 is inserted leading so that the shaft 15a of the slider 10 is aligned with the slit 7a of the cylinder 7. The second projection 11 is thus exposed to the outside of the cylinder through the central hole of the stop 21. Then, the spring 12 and the stationary member 8 are inserted into the nontapered end 7b of the cylinder 7, such that the length L as defined above corresponds to the distance between the mounting arms 13a and 13b of the watch.

In order to mount the spring rod of this embodiment between the mounting arms 13a and 13b of the watch, the first projection 9 is first inserted into the hole 14a of the mounting arm 13a. Then, by applying pressure to the tongue 15, the cylinder 10 is moved inwardly along the cylinder 7, so that the spring rod can be fitted between the mounting arms 13a and 13b. When the second projection 11 opposes the hole 14b of the mounting arm 13b, the tongue 15 is released so that the second projection 11 is inserted into the hole 14b by the biasing force of the spring 12.

In this embodiment, the stop 21 and the stationary member 8 may be fixed to the cylinder 7 by adhesion with an adhesive, brazing, welding or the like. When a spring rod having a stop 21 and a stationary member 8 fixed in this manner is to be used to mount a watch on a flexible strap of leather, a synthetic resin or the like, the spring rod is inserted into a loop formed by a looped portion 22 thereof as shown in FIG. 9 such that the hole 17 formed in the looped portion 22 and the tongue 15 of the spring rod are linearly aligned. The tongue 15 then protrudes to the outside through the hole 17. Alternatively, the spring rod is inserted into the loop formed by the looped portion 22 of the watch strap 16 such that the tongue 15 opposes a bonded portion 23 of the loop. The spring rod is then rotated within the loop formed by the looped portion 22 of the watch strap 16, so that the tongue 15 protrudes outward through the hole 17 formed in the looped portion 22 of the watch strap 16.

Figure 10:
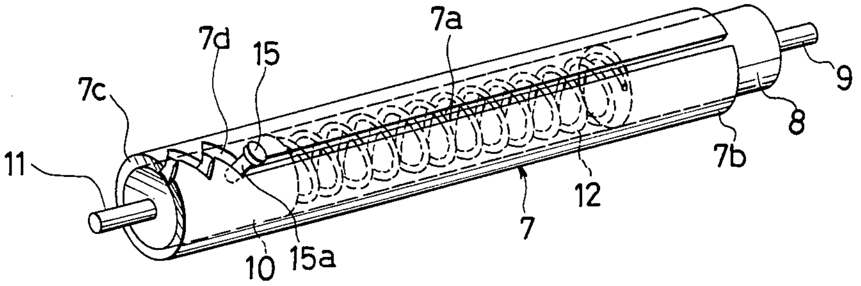
FIG. 10 is a perspective view of still another embodiment of the present invention.

In accordance with still another embodiment shown in FIG. 10, a slider 10 has a main body portion which has an outer diameter smaller than the inner diameter of a cylinder 7, so that the slider 10 is slidable within the cylinder 7. The main body portion has a second projection 11 at its outer end. A tongue 15 is exposed through a slit *7a* of a cylinder 7 to be slidable therealong. An end of the slit *7a* at the side of the second projection 11 is bent in a zigzag form, thus defining a stop *7d* for stopping the slider 10.

Figure 11:
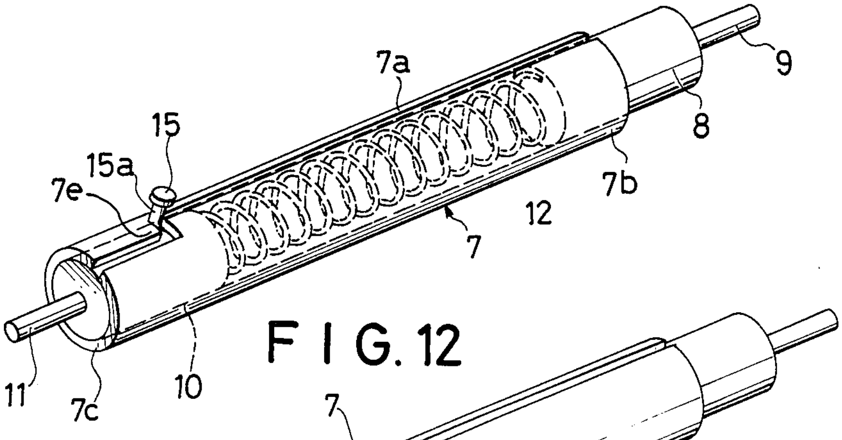
FIG. 11 is a perspective view of the spring rod shown in FIG. 10.

Still another embodiment of the present invention shown in FIG. 11 is similar to that shown in FIG. 10 except that an end of the slit *7a* at the side of a second projection 11 is bent in a right angle as a crank, thereby defining a stop *7e*.

Figure 12:
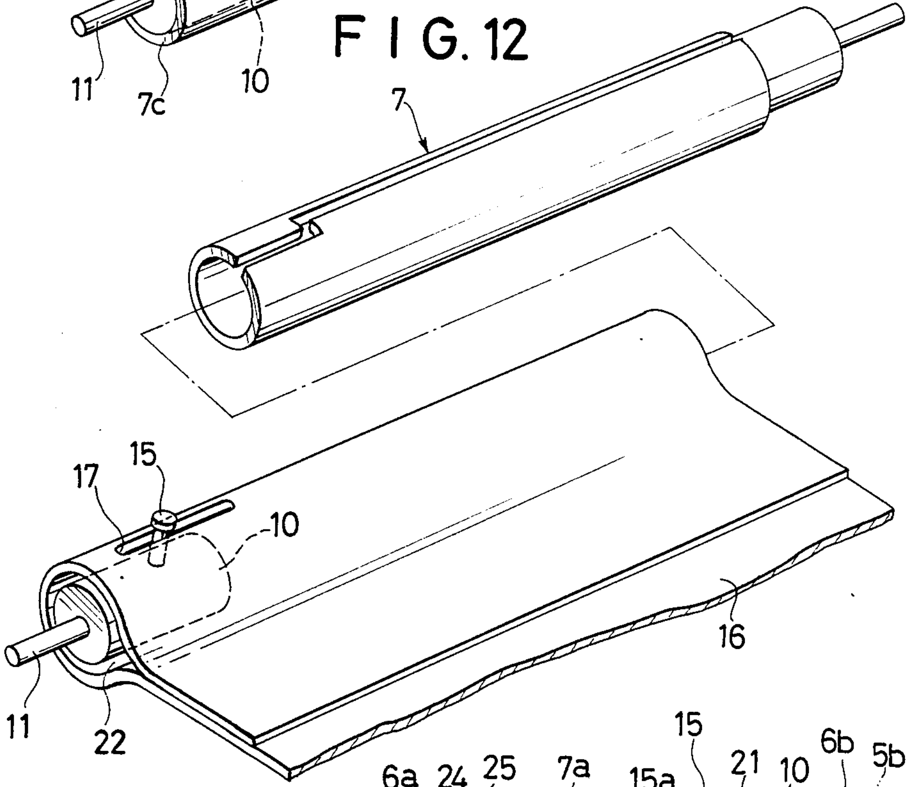
FIG. 12 is a perspective view of the spring rod shown in FIGS. 10 and 11 when it is inserted into a loop of a watch strap.

In order to mount the spring rod of the embodiment shown in FIGS. 10 or 11 on a strap 16, as shown in FIG. 12, the slider 10 is inserted in a loop formed by a looped portion 22 of the strap 16 while the tongue 15 of the slider 10 is inserted into a hole 17 formed in the looped portion 22. Subsequently, a stationary member 8 is inserted into one end *7b* of the cylinder 7 at which the stop *7d* or *7e* is not arranged. Then, a spring 12 is inserted into the cylinder 7. As indicated by the arrow in FIG. 12, the cylinder 7 is rotated and inserted into the loop such that the shaft *15a* of the tongue 15 is aligned with the slit *7a*. The shaft *7a* of the tongue 15 is stopped at the bent portion of the stop *7d* or *7e* as shown in FIGS. 10 or 11.

In order to mount the strap 16 with the spring rod of these embodiments on mounting arms *13a* and *13b*, the first projection 9 of the stationary member 8 is inserted in the hole of a mounting arm. Then, the tongue 15 is urged to move the shaft *15a* along the slit *7a*. When the second projection 11 of the slider 10 opposes the hole of the mounting arm, the tongue 15 is released so that the second projection 11 is inserted into the hole by the biasing force of the spring 12. As a result, the slider 10 is kept in position by the biasing force of the spring 12, thus completing mounting of the spring rod to the mounting arms.

The spring rod according to the embodiment shown in FIGS. 10 or 11 may be mounted by another method. According to this method, the slider 10 is inserted into the loop of the looped portion 22 while the tongue 15 of the slider 10 is inserted into the hole 17 formed in the looped portion 22 of the strap 16. Subsequently, the cylinder 7 is inserted with its end *7b* without the stop *7d* or *7e* leading into the loop of the looped portion 22 while the shaft *15a* of the tongue 15 is aligned with the slit *7a* until the tongue 15 abuts against the stop *7d* or *7e*. Thereafter, the spring 12 and the stationary member 8 are pushed into the cylinder 7 from its end *7b* to complete assembly. The length of the slit of the stop may be smaller than the diameter of the shaft of the tongue.

Figure 13:
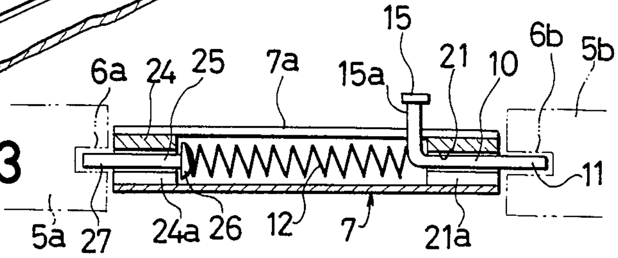

In accordance with still another embodiment of the present invention shown in FIG. 13, two ends of a cylinder 7 are nontapered. A first stop 21 and an L-shaped slider 10 are arranged at one end of the cylinder 7. The stop 21 comprises a pipe with a longitudinal slit *21a*. The slider 10 is slidable within the stop 21 and has a second projection 11 at an outer end. A second stop 24 and a pin 25 are arranged at the other end of the cylinder 7. The second stop 24 comprises a pipe with a longitudinal slit *24a*. The pin 25 is slidable through a central hole of the second stop 24. The pin 25 consists of a head 26 which is smaller than the inner diameter of the cylinder 7 and larger than that of the second stop 24, and a first projection 27 which protrudes outside the cylinder 7 through the second stop 24. A spring 12 constantly urges the L-shaped slider 10 and the head 26 of the pin 25 apart, i.e., outward.

In order to mount the spring rod of this embodiment on mounting arms *5a* and *5b* of the watch, the projection 27 of the pin 25 is inserted in a hole *6a* of the mount arm *5a*. Subsequent procedures as those described with reference to FIGS. 8 and 9 are followed. In this embodiment, the stops 21 and 24 may comprise pipes of the same shape.

What is claimed is:

1. A spring rod for a strap, comprising a cylinder having a first projection at one end thereof and a longitudinal slit extending from the other end thereof, a slider which is slidably mounted at the other end of said cylinder and which has a second projection on an outer end thereof, and a biasing spring interposed between said first projection and said slider, wherein said cylinder has a stop for said slider at the other end thereof, and wherein said stop comprises a pipe which is inserted into said cylinder.

2. A spring rod according to claim 1, wherein said pipe has a slit along an entire length thereof.

3. A spring rod for a strap, comprising a cylinder having a first projection at one end thereof and a longitudinal slit extending from the other end thereof, a slider which is slidably mounted at the other end of said cylinder and which has a second projection on an outer end thereof, and a biasing spring interposed between said first projection and said slider, wherein said cylinder has a stop for said slider at the other end thereof, and wherein said stop comprises a zigzag slit at the other end of said cylinder.

4. A spring rod for a strap, comprising a cylinder having a first projection at one end thereof and a longitudinal slit extending from the other end thereof, a slider which is slidably mounted at the other end of said cylinder and which has a second projection on an outer end thereof, and a biasing spring interposed between said first projection and said slider, wherein said first projection is slidable relative to said cylinder, and wherein said first projection is formed on a pin which is inserted inside a stop arranged inside said cylinder.

5. A spring rod according to claim 4, wherein said stop comprises a pipe with a longitudinal slit.

* * * * *